United States Patent [19]

Rodriguez et al.

[11] Patent Number: 5,392,072
[45] Date of Patent: Feb. 21, 1995

[54] HYBRID VIDEO COMPRESSION SYSTEM AND METHOD CAPABLE OF SOFTWARE-ONLY DECOMPRESSION IN SELECTED MULTIMEDIA SYSTEMS

[75] Inventors: Arturo A. Rodriguez; Steven M. Hancock, both of Boca Raton; Mark A. Pietras, Boynton Beach, all of Fla.

[73] Assignee: International Business Machines Inc., Armonk, N.Y.

[21] Appl. No.: 965,580

[22] Filed: Oct. 23, 1992

[51] Int. Cl.$^6$ .................. H04N 7/12; H04N 11/02
[52] U.S. Cl. .................... 348/405; 348/384; 348/396; 348/419; 348/420
[58] Field of Search ............... 358/133, 135, 136, 105; 348/404, 405, 407, 419, 420, 398, 396, 384; H04N 7/12, 11/02

[56] References Cited

U.S. PATENT DOCUMENTS

| | | | |
|---|---|---|---|
| 4,492,454 | 4/1984 | Powell | 358/135 |
| 4,703,350 | 10/1987 | Hinman | 358/105 |
| 4,839,810 | 7/1989 | Ericsson | 358/135 |
| 5,103,306 | 4/1992 | Weiman et al. | 348/400 |
| 5,107,345 | 4/1992 | Lee | 358/136 |
| 5,150,209 | 9/1992 | Baker et al. | 358/133 |
| 5,237,410 | 8/1993 | Inoue | 358/136 |

Primary Examiner—Tommy P. Chin
Assistant Examiner—Vu Le
Attorney, Agent, or Firm—Bernard D. Bogdon

[57] ABSTRACT

Hybrid compression processes for digital color video data that enables software only playback of the compressed digital video in low-end computers, wherein intraframe and interframe compression techniques are brought together through a sequence of procedures that analyze local frame regions, integrate unique processes with block truncation coding compression, and adopt the advantages of visual pattern image coding for color video. The process determines the appropriate encoding of each local frame region with one of various compression techniques, based upon its image properties. The compression methods retain the fidelity of the original video data to provide high quality video during decompression and reconstruction of high motion and textured video clips, while simultaneously providing sufficient compression and ease of decoding for software-only decompression thereby exhibiting properties that enable good quality video to be displayed in low-end computers.

12 Claims, 14 Drawing Sheets

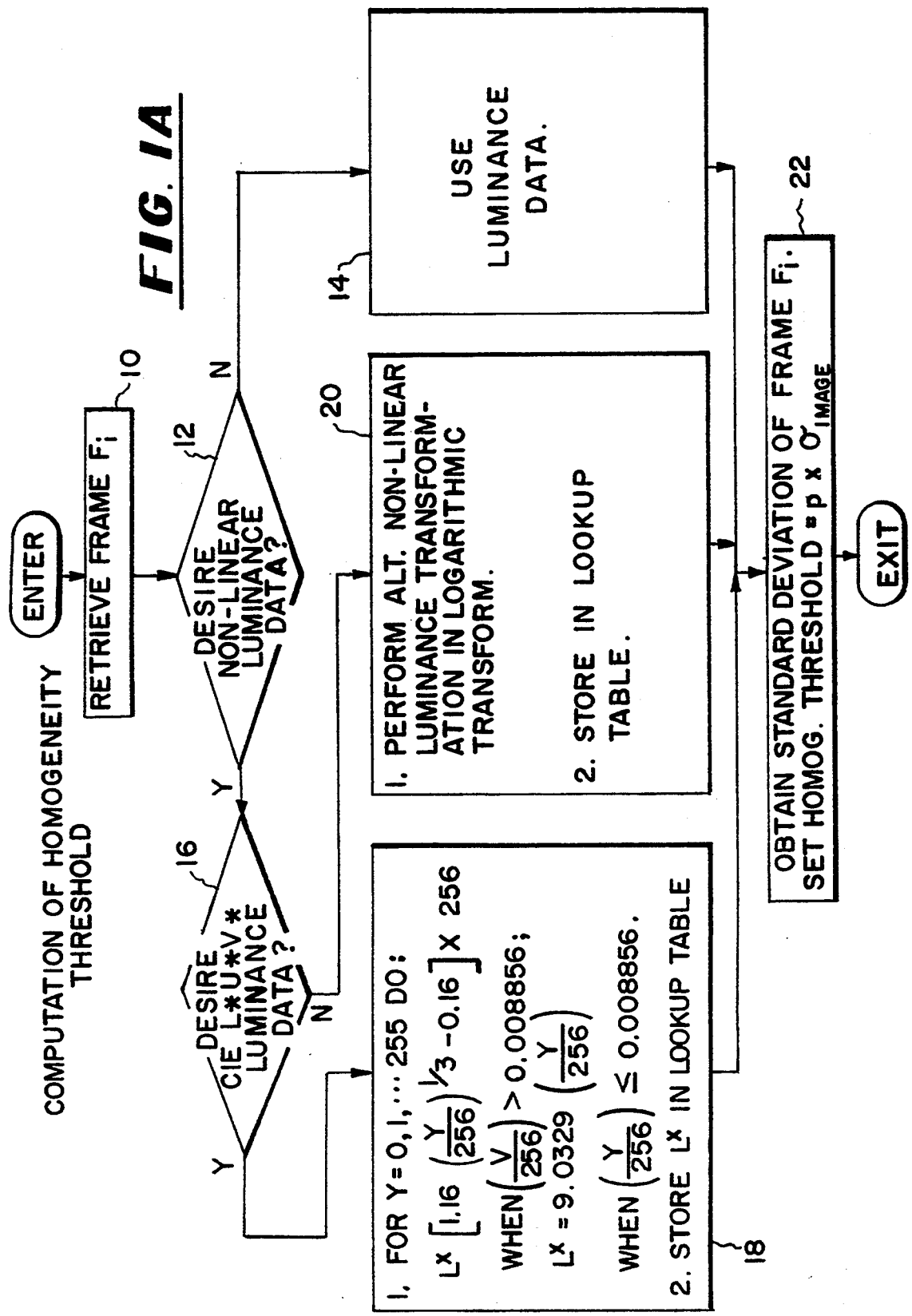

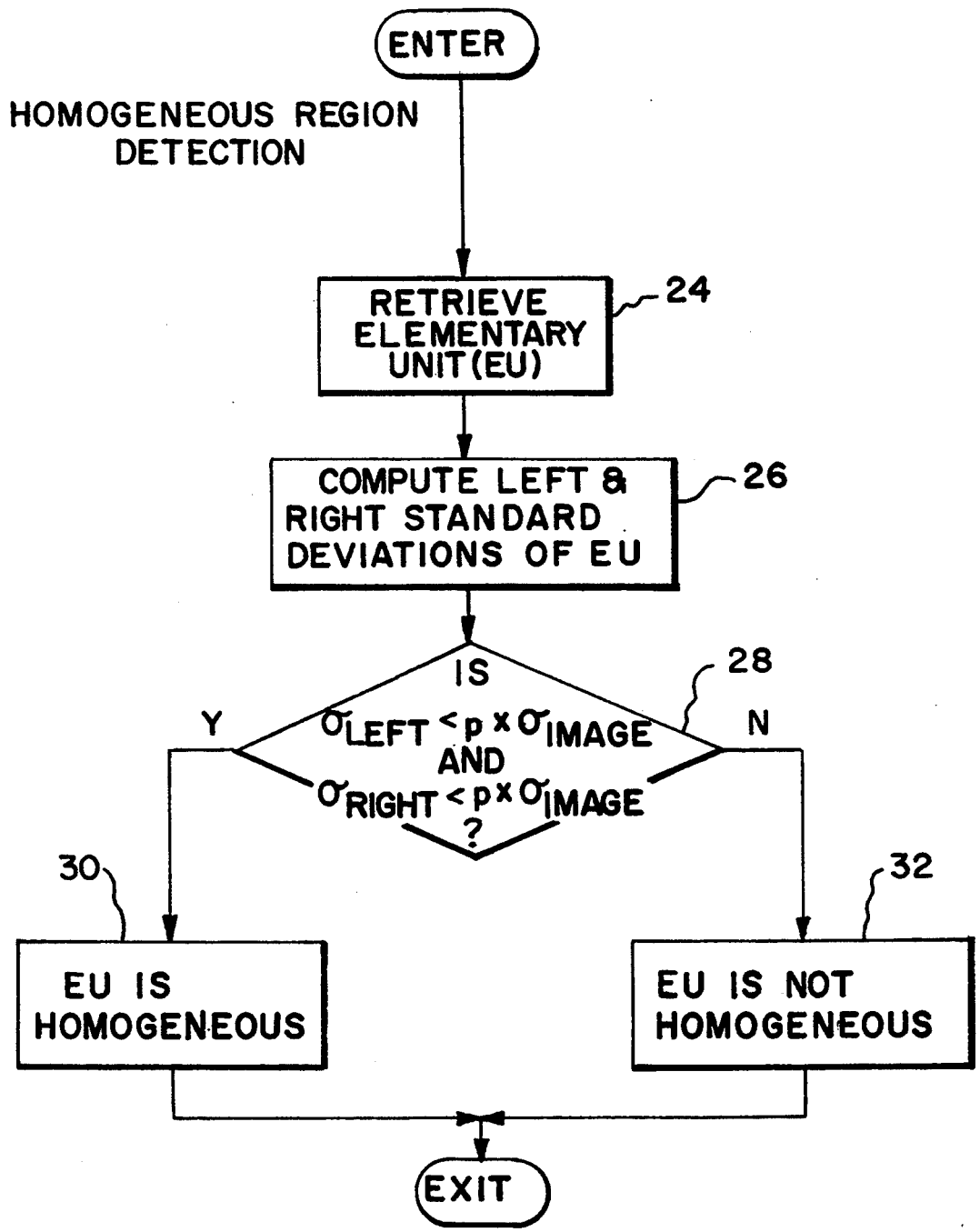
FIG. IB

FIG. 10

TABLE 1

|  | A | B | C | D |
|---|---|---|---|---|
| 0° <br> SET 1 | 0111<br>0111<br>0111<br>0111 | 0011<br>0011<br>0011<br>0011 | 0001<br>0001<br>0001<br>0001 | |
| 45° <br> SET 2 | 1111<br>1111<br>0111<br>0011 | 1111<br>0111<br>0011<br>0001 | 0111<br>0011<br>0001<br>0000 | 0011<br>0001<br>0000<br>0000 |
| 90° <br> SET 3 | 1111<br>0000<br>0000<br>0000 | 1111<br>1111<br>0000<br>0000 | 1111<br>1111<br>1111<br>0000 | |
| 135° <br> SET 4 | 1111<br>1111<br>1110<br>1100 | 1111<br>1110<br>1100<br>1000 | 1110<br>1100<br>1000<br>0000 | 1100<br>1000<br>0000<br>0000 |
| 180° <br> SET 5 | 1000<br>1000<br>1000<br>1000 | 1100<br>1100<br>1100<br>1100 | 1110<br>1110<br>1110<br>1110 | |
| 225° <br> SET 6 | 0000<br>0000<br>1000<br>1100 | 0000<br>1000<br>1100<br>1110 | 1000<br>1100<br>1110<br>1111 | 1100<br>1110<br>1111<br>1111 |
| 270° <br> SET 7 | 0000<br>1111<br>1111<br>1111 | 0000<br>0000<br>1111<br>1111 | 0000<br>0000<br>0000<br>1111 | |
| 315° <br> SET 8 | 0000<br>0000<br>0001<br>0011 | 0000<br>0001<br>0011<br>0111 | 0001<br>0011<br>0111<br>1111 | 0011<br>0111<br>1111<br>1111 |

FIG. II

TABLE II

| K VALUE GROUP | ROW | COL. | DEG. | $K_{LOW}$ | $K_{HIGH}$ |
|---|---|---|---|---|---|
| G1 | 1 | A | 0 | −1.5 | +.05 |
|  | 3 | C | 90 |  |  |
|  | 5 | C | 180 |  |  |
|  | 7 | A | 270 |  |  |
| G2 | 1 | B | 0 | −.05 | +.05 |
|  | 3 | B | 90 |  |  |
|  | 5 | B | 180 |  |  |
|  | 7 | B | 270 |  |  |
| G3 | 1 | C | 0 | −.05 | +1.5 |
|  | 3 | A | 90 |  |  |
|  | 5 | A | 180 |  |  |
|  | 7 | C | 270 |  |  |
| G4 | 2 | A | 45 | −1.532064693 | +0.353553391 |
|  | 4 | A | 135 |  |  |
|  | 6 | D | 225 |  |  |
|  | 8 | D | 315 |  |  |
| G5 | 2 | B | 45 | −0.883883476 | +0.530330086 |
|  | 4 | B | 135 |  |  |
|  | 6 | C | 225 |  |  |
|  | 8 | C | 315 |  |  |
| G6 | 2 | C | 45 | −0.530330086 | +0.883883476 |
|  | 4 | C | 135 |  |  |
|  | 6 | B | 225 |  |  |
|  | 8 | B | 315 |  |  |
| G7 | 2 | D | 45 | −0.353553391 | +1.532064693 |
|  | 4 | D | 135 |  |  |
|  | 6 | A | 225 |  |  |
|  | 8 | A | 315 |  |  |

TABLE III
BINARY PATTERNS FOR 2-D RAMP FUNCTIONS
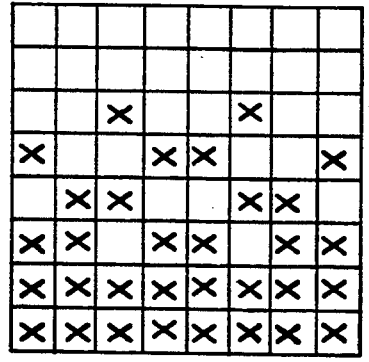
VERT. AXIS Δ'=CONSTANT
HORIZ. AXIS Δ'≃∅
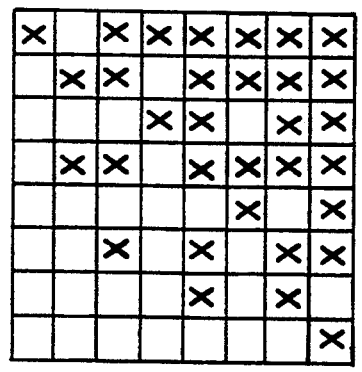
HORIZ. AXIS Δ'=CONSTANT
VERT. AXIS Δ'≃∅
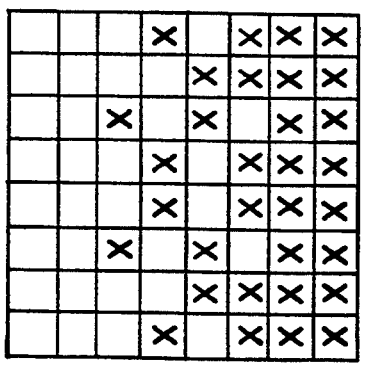
SW-TO-NE Δ'=CONSTANT
NW-TO-SE Δ'≃0
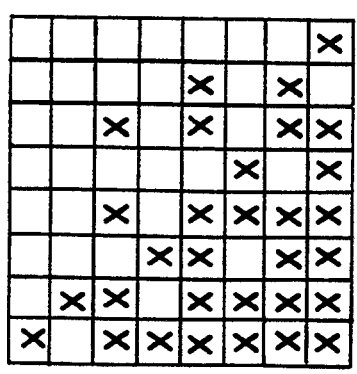
NW-TO-SE Δ'=CONSTANT
SW-TO-NE Δ'≃0
FIG. 12

TABLE IV

COLOR SELECTION FOR AVG. COLOR COMPUTATION FOR RESPECTIVE RAMPS

HYBRID VIDEO COMPRESSION SYSTEM AND METHOD CAPABLE OF SOFTWARE-ONLY DECOMPRESSION IN SELECTED MULTIMEDIA SYSTEMS

BACKGROUND OF THE INVENTION

1. Technical Field

Generally the invention relates to the compression of digital video signals which are stored and played back in real-time on a digital computer. More particularly the invention relates to a method of data compression that supports real-time recovery, decompression, reconstruction, and display of digitized video signals on a minimal personal computer system and specifically, the invention relates to hybrid methods of compression of digital video that enables real-time video decompression and playback with a computational load readily carried by the central processing unit (CPU) of low-end personal computers (e.g. a computer based upon an Intel 80386SX processor running at 16 mhz) without hardware modification of the computer while maintaining satisfactory high level perceived video quality by retaining the fidelity of the original video data, providing an optimization balance of compression, ease in decoding and video quality.

2. Description of the Related Art

A video signal is a sequence of images or frames, which are displayed at a given frame rate (e.g., 15 to 30 frames-per-second) to simulate the appearance of motion to a human observer. In a personal computer system, each frame of digitized video includes a digital representation of each pixel in the frame. A frame may have in excess of one half a million pixels. If full frames were replaced at a frame rate in excess of 15 frames-per second, a computer would be required to recover from storage and write to video memory over seven million bytes of data each second. Few current auxiliary data storage devices have the bandwidth required to pass such levels of data. Further, storage of only a few full frames of digitized video would fill most storage devices.

As used here, bandwidth means the volume of data per unit of time which can be recovered from an auxiliary storage device. Data compression is used to accommodate auxiliary storage devices in the storage and recovery of video segments for playback in real time and to reduce traffic on the system bus.

Data compression allows an image or video segment to be transmitted and stored in substantially fewer bytes of data than required for full frame reproduction. Data compression can be based on eliminating redundant information from frame to frame in a digitized video segment (interframe or temporal compression), or by eliminating redundant information from pixel to pixel in individual frames (intraframe or spatial compression). Video compression techniques that are "lossy" do not fully preserve all the information originally captured in a scene.

Frame differencing compression methods, a form of interframe compression, exploit the temporal redundancy that exists between digital video frames from the same scene recorded moments apart in time. This reduces the required data needed to encode each frame. Two successive frames from a sequence of digital motion video frames are compared region by region (or pixel by pixel). The comparison process determines whether two corresponding regions are the same or different. The size and location of each region and the nature of the comparison and the definition of "same" and "different" depends on the set of thresholds supplied during compression.

Before a temporal redundancy can exist, one frame represents a point in time before another frame. If two regions being compared are the same, then the pixels in the regions from frame N do not need to be encoded and stored if the pixels in a frame N−1 are already known. When two regions are different, the pixels in the later frame must be encoded and stored. When each region of two frames have been compared, encoded and stored, the process moves to the next pair of frames. During playback, the decompression process adds the stored information for each frame to the current state of the display memory using a process that is the logical reverse of the encoding process.

In low-end personal computers, the CPU handles rewriting of the video memory buffer. Rewriting of the entire buffer every one fifteenth of a second would represent an excessive load on the CPU. Full frame storage and recovery is rarely, if ever, used for video playback on computer systems. Digital video generation on digital computers can be achieved by using frame differencing techniques to compress the data for storage and passage to and from storage. In general terms, frame differencing codes only such information that differs from one frame to the next. In reconstruction of a frame, the old frame residing in display memory is rewritten only to the extent changed. Since few of the pixels typically change from frame to frame, frame differencing techniques save considerable storage space and substantially reduce the bandwidth demands on auxiliary storage devices. However, such techniques require processor involvement to decompress video signal data to rewrite the changed portions of the frame. Typically, and in low end personal computers almost certainly, processor involvement takes the form of the CPU decompressing the data stream from the auxiliary storage device and writing the changed sections of the frame stored in the video buffer.

It is desirable to have a video compression method based on intraframe and interframe compression techniques that provides an optimal balance of compression, ease of decoding for minimal computer systems, and high video quality for the compression of video segments that exhibit texture and high-levels of motion.

RELATED APPLICATIONS

The following, which are assigned to the same assignee of this application and are hereby incorporated herein by reference, are related:

(1) "SCALABLE DIGITAL VIDEO DECOMPROCESSOR", Ser. No. 07/965,129, filed Oct. 22, 1992 by A. A. Rodriguez et al;

(2) "SYSTEM AND METHOD OF MEASURING FIDELITY OF DECOMPRESSED VIDEO SIGNALS AND IMAGES", Ser. No. 07/965,649, filed Oct. 22, 1992 by A. A. Rodriguez et al;

(3) "SYSTEM AND METHOD FOR FRAME-DIFFERENCING VIDEO COMPRESSION/DECOMPRESSION USING PERCEPTUALLY-CONSTANT INFORMATION AND IMAGE ANALYSIS", Ser. No. 07/958,433, FILED Oct. 8, 1992 by A. A. Rodriguez et al; and (4) "SYSTEM AND METHOD FOR VIDEO COMPRESSION WITH ARTIFACT DISPER- SION CONTROL", Ser. No. 07/965,579, concurrently filed by A. A. Rodriguez et al; and (5) "SYSTEM AND METHOD FOR FRAME DIFFERENCING VIDEO COMPRESSION AND DECOMPRESSION WITH FRAME RATE SCALABILITY", Ser. No. 07/963,791, filed Oct. 20, 1992 by A. A. Rodriguez et al.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

SUMMARY OF INVENTION

This invention is with regard to a hybrid method for compression of digital color video data that enables software only playback of the compressed digital video in low-end computers. Novelty in the method resides in the fact that various compression techniques are integrated through a sequence of procedures that analyze local frame regions. The compression method attains an excellent compromise of retaining the fidelity of the original video data to provide high quality video during decompression and reconstruction of high motion and textured video clips, while simultaneously providing sufficient compression, and while simultaneously providing sufficient ease-of-decoding for software-only decompression and display in low-end computers.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1A is a logic flowchart of a method for computation of the homogeneity threshold;

FIG. 1B is a logic flowchart of a method for homogeneous region detection.

Figure 2:
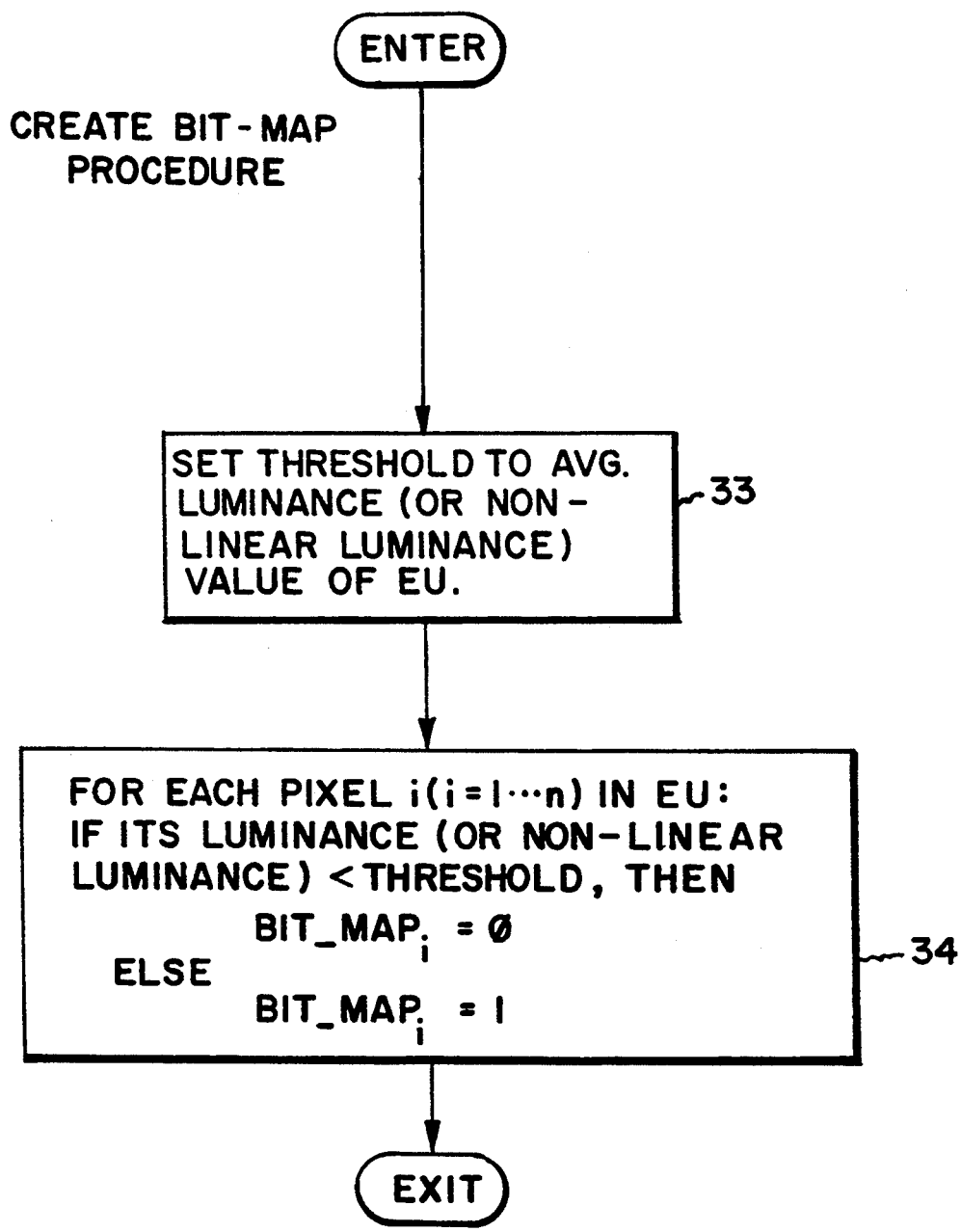
FIG. 2 is a logic flowchart of the process used to create a (binary) Bit_Map for an elementary unit (EU)

Table I is a presentation of the binary pattern sets for the eight gradient direction quantization steps;

Table II is a presentation of the values of the coefficients associated with the binary patterns of Table I;

Table III is a presentation of binary patterns for two dimensional (2-D) ramp functions; and Table IV is a presentation of color sampling selection for average color computation for the respective ramps in Table III.

DETAILED DESCRIPTION OF THE INVENTION

"OS/2", "PS/2", and "Ultimotion" are trademarks of International Business Machines Corporation in the United States. "80386SX" is a registered trademark of Intel Corporation in the United States.

This invention discloses a video compression algorithm known as the Ultimotion compression algorithm and is based on a set of procedures that analyze local frame regions to compress each of such regions. After the procedures are performed on a region, the information processed and selected to represent the region is encoded with a scalable video stream definition as described in the above referenced and related U.S. patent application (1) entitled Scalable Digital Video Decompressor.

The inventive compression algorithm decomposes each frame into non-overlapping contiguous rectangular regions for the purpose of analyzing the frame. Each discrete rectangular region is called an elementary unit (EU). The size of an elementary unit is x_size_of_elementary_unit by y_size_of_elementary_unit. A parent elementary unit is a larger rectangular image region comprised of the northwest, northeast, southwest, and southeast elementary units that form the larger rectangular region, which when observed in plan view can also be referred to as the upper left, upper right, lower left and lower right sections or areas, respectively.

In the following description, for ease of presentation, an elementary unit's size is arbitrarily selected to be equal to 4×4 pixels and consequently a corresponding parent elementary unit's size is equal to 8×8 pixels. The present compression algorithm can compress a video clip by compressing a video frame with elementary units only, or by compressing each parent elementary unit, if possible, to obtain the maximum compression. If a parent elementary unit does not exhibit properties that permit its compression as an entity, the alternative is to decompose the parent elementary unit into four quadrants, and then compress each quadrant as an elementary unit.

Compression Method for Elementary Units:

There are four types of compressed elementary units that can be produced. These types are identified as unchanged, homogeneous, pattern, or predetermined pattern elementary units. The type of each elementary unit is specified in the compressed video stream.

This distinguishable contribution of a general hybrid intraframe compression algorithm process comprises the following procedural steps:

1. Decompose the frame into non-overlapping contiguous rectangular regions.

2. Obtain luminance information that represents the frame. This is done preferably with lookup tables.

3. Compute the standard deviation σ of the frame's luminance information over the complete frame by using the method and techniques described and identified in the before identified related patent application (3) entitled System and Method for Frame-Differencing Video Compression/Decompression Using Perceptually-Constant Information and Image Analysis.

4. Store the computed value in σ_Y_of_frame.

5. Find the region homogeneity threshold $T_{hom}$ of each region or elementary unit (EU) in accordance with the following:

$$T_{hom} = p(\sigma\_Y\_of\_frame)$$

where p is a parameter dependent on the size of the elementary unit; the smaller the size of the elementary unit, the less the variation that should be acceptable for a region to be homogeneous. As the value of p increases, the amount of compression attained increases but at the risk of introducing artifacts. Typical values for p, that provide a good amount of video compression, while simultaneously introducing few artifacts, are:

0.175 to 0.250 for 4×4 elementary units,
0.2000 to 0.3000 for 8×8 elementary units, and
0.2000 to 0.333 for 16×16 elementary units.

The p parameter and the theory that derives the appropriate value of p was originated by A. A. Rodriguez and O. R. Mitchell and is set forth in the journal article entitled Image Segmentation By Successive Background Extraction, for the Pattern Recognition Society, in Vol. 24, No. 5 at pp. 409–420, 1991. The article is identified here for its contribution regarding the p parameter and its theory of deviation, notwithstanding that the objective and thrust of that article is image segmentation and not video compression as presented here.

Since $T_{hom}$ depends on a σ_Y_of_frame, homogeneous region detection is adaptive to frame content (i.e., frame information).

6. Perform the following procedures for each elementary unit in the frame:

a. Compute the left and the right standard deviations of the luminance (Y) of the elementary unit, σ(left) and σ(right), respectively, as follows:
  1) Find the luminance mean of the elementary unit, $Y_{avg}$;
  2) Create a bit_map for the elementary unit: if a pixel's luminance value ≦$Y_{avg}$, then: assign its corresponding bit in the bit_map a "0" value; otherwise assign its corresponding bit in the bit_map a "1" value;
  3) Find average luminance value for all pixels in the EU with corresponding bit_map value equal to "0". Store the computed value in Y_avg_low;
  4) Similarly, find average luminance value for all pixels in the EU with corresponding bit_map value equal to "1". Store the computed value in Y_avg_high;
  5) Compute the left and right standard deviations: $\sigma_{left} = Y_{avg} - Y\_avg\_low$, and $\sigma_{right} = Y\_avg\_high - Y_{avg}$; and
  6) Alternatively, the left and right standard deviations can be computed as defined in the 1991 Pattern Recognition Society article cited above.

b. Determine if the elementary unit is homogeneous:
  If ($\sigma_{left} < T_{hom}$) and ($\sigma_{right} < T_{hom}$) then the elementary unit is homogeneous.

The described method of detecting homogeneous image regions is one which is accommodating to region conditions of varying uniformity. As an example, it inherently does not require the luminance distribution of a perceptually-homogeneous region to be symmetrical. In actuality, most pixel distributions of perceptually-homogeneous image regions are asymmetrical.

c. If the elementary unit is homogeneous: Encode it by specifying its type—homogeneous—in the compressed video stream and by specifying the average color value of the elementary unit.

d. If the elementary unit is NOT homogeneous: Encode it with the bit_map which is treated as a binary pattern (ordered in a raster scan of the elementary unit) and two color values. The first color value is associated with the "0" bits of the binary pattern. The second color value is associated with the "1" bits of the binary pattern.

The binary pattern can be included in the video stream with the two color values to provide information to the decoder on how to reconstruct the elementary unit during video playback. Elementary units encoded as such are called pattern elementary units. Alternatively, an index_byte representing an offset to a Table of Patterns can be provided in the video stream with the two color values. This type of elementary unit is called a predetermined-pattern elementary unit.

e. Proceed to compress and encode the next elementary unit in the frame.

The binary pattern and the two color values computation and encoding for an elementary unit which is NOT homogeneous is accomplished in accordance with the following procedures:

1. Block Truncation Coding (BTC) was presented by E. J. Delp and O.R. Mitchell as described in the Sept. 1979 IEEE Journal article entitled Image Compression Using Block Truncation Coding from the IEEE Transactions on Communications, Vol. COM-27, No. 9. Delp and Mitchell disclosed BTC for luminance images. Extension to color images, as could be used in the compression algorithm disclosed herein, has been described in other articles and is readily known and available to those skilled in the art.

In the color BTC procedure, the binary pattern is equal to the bit_map created in the before described general hybrid intraframe compression algorithm. The first color value is computed by averaging the color values of all the pixels in the elementary unit whose bit_map (i.e., binary pattern) value are "0". Similarly the second color value is computed by averaging the color values of all the pixels in the elementary unit whose bit_map (i.e., binary pattern) value are "1".

This invention provides unique encoding of an elementary unit with color BTC in accordance with the following:

a. An alternative to using $Y_{avg}$ as the threshold to determine the bit_map in the above mentioned general algorithm is to compute the threshold with the following non-linear luminance data spaces:
  1) the logarithmic transformation implementation that is adaptive to the dynamic range of the luminance information in the frame, is generated as described in the before referenced and related U.S. patent application (2) entitled System and Method of Measuring Fidelity of Decompressed Video Signals and Images; and 2) the non-linear luminance transformation in the CIE L*u*v* 1976 color space recommended by the Commission Internationale de l'Eclairage (CIE).

b. In the alternative to using the average colors of pixels in the BTC process, whose values are below and above the threshold that determines the bit__map, compute the left and right standard deviations for each color component as defined in the before mentioned 1991 Pattern Recognition Society article.

2. The present inventors have recognized that the methods described by D. Chen and A. C. Bovik in the 1990 IEEE Journal article entitled Visual Pattern Image Coding (VPIC), from the IEEE Transactions on Communications, Vol. 38, No. 12 for luminance images, can also be used to generate the binary pattern and the two color values. The extension of the VPIC method to color video was not described in the article. The color VPIC method is illustrated in FIGS. 4 and 5 by steps 48, 50, 52, 54, 56, 60, 64, 66 and 68.

In the color VPIC procedure, the luminance gradient direction of the elementary unit (step 50 of FIG. 4) is found from the angle specified by the arc tangent of the change, from bottom to top, of the luminance values in the elementary unit over the change, from left to right, of the luminance values in the pattern. To compute the gradient direction, the vertical change can be computed as the sum of the luminance values in the top half of the elementary unit minus the sum of the luminance values in the bottom half. Likewise, the left half can be subtracted from the right half to obtain the horizontal change.

The arc tangent function can be implemented with lookup tables or with a limited number of comparisons depending on the angle quantization step desired. In the before mentioned article by Chen and Bovik, the angle quantization step is 45 degrees which results in eight possible directions. Those directions are at 0, 45, 90, 135, 180, 225, 270 and 315 degree values.

Figure 4:
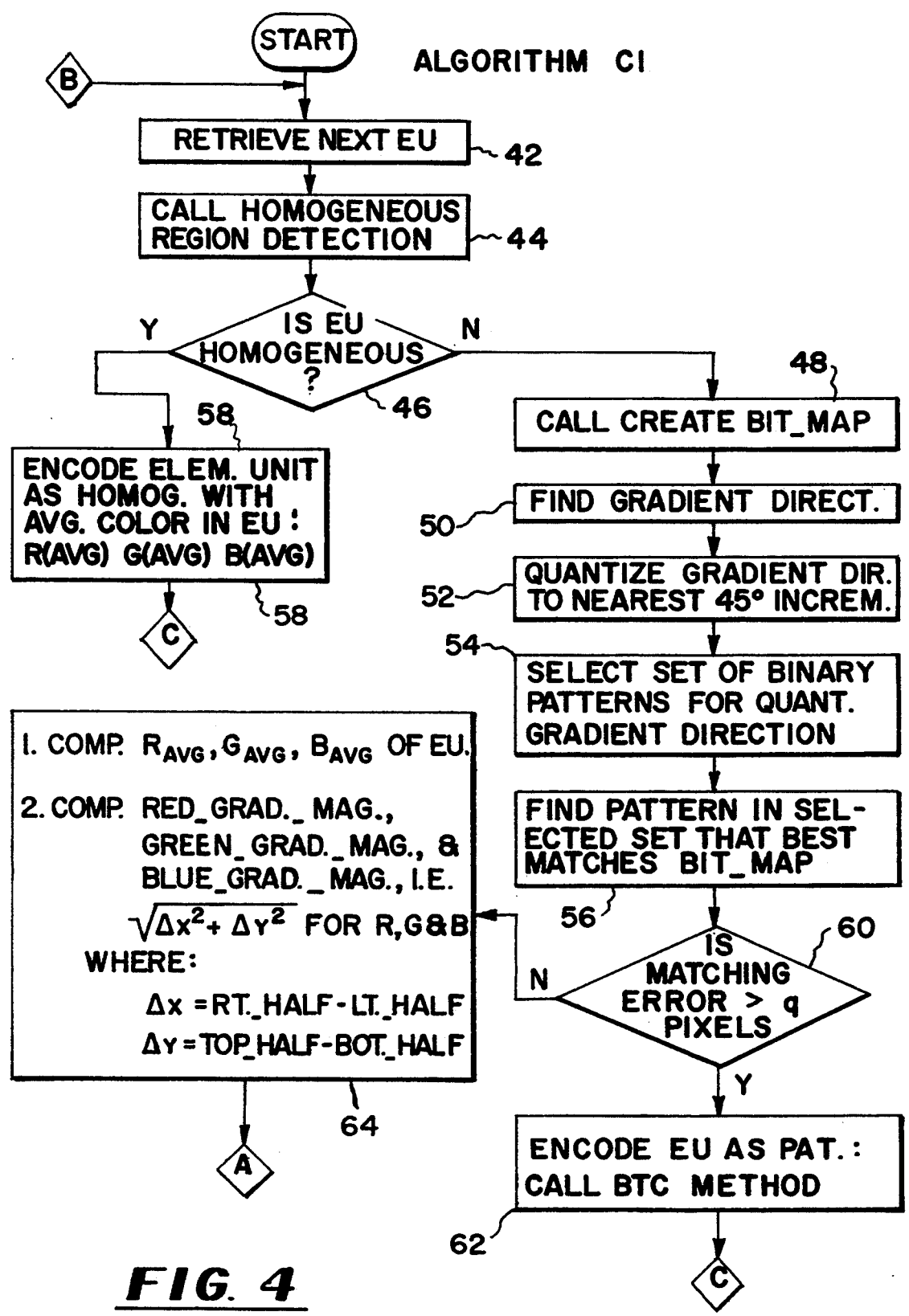
FIG. 4 is a logic flowchart of an intraframe compression method that only compresses elementary units, first by the method of homogeneous region detection, second by the method of visual pattern image coding and third by the block truncation coding method in accordance with the principles of this invention.
Figure 5:
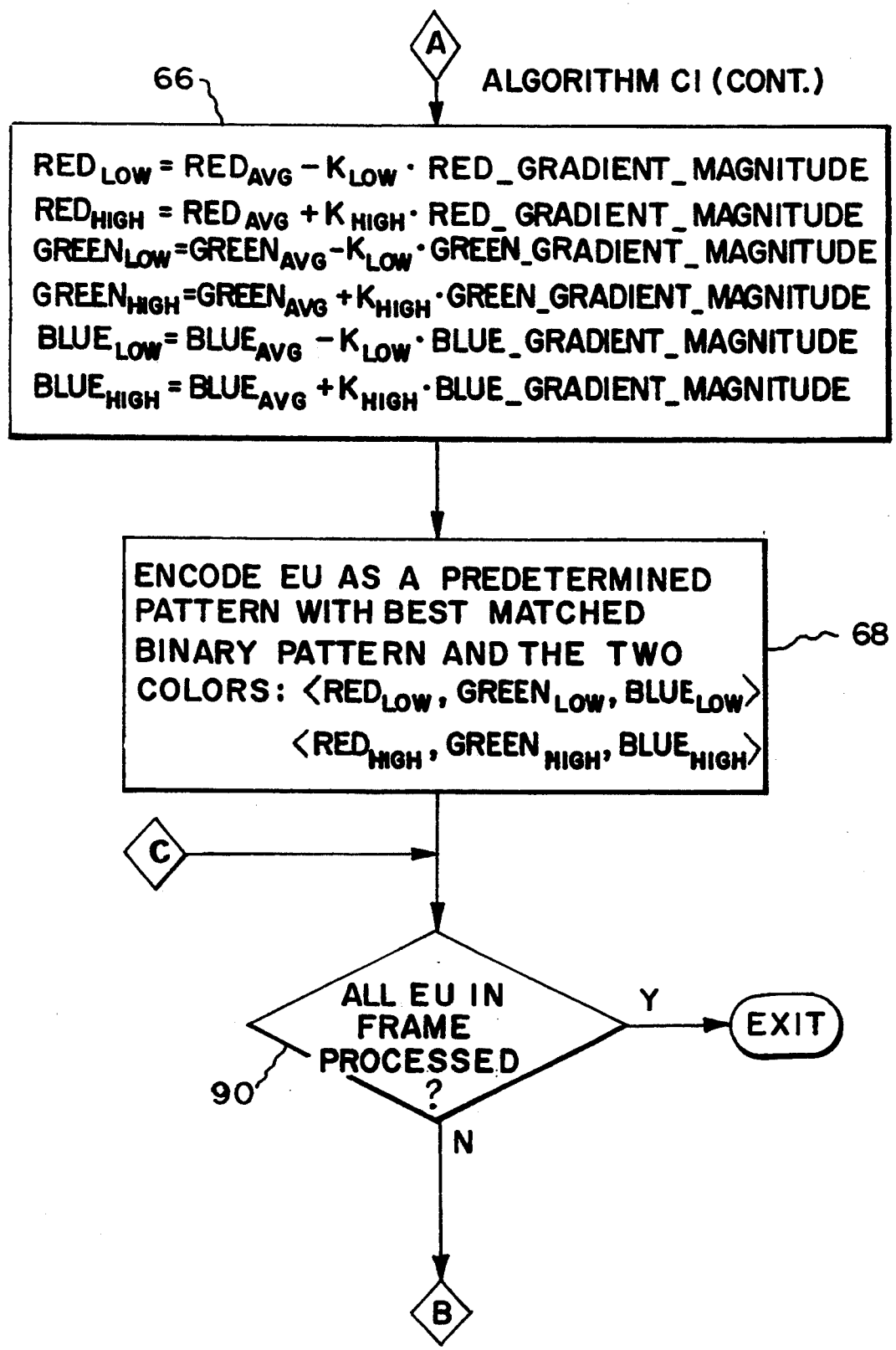
FIG. 5 is a logic flowchart illustrating the continuation of the processes of FIG. 4.

Once the quantized gradient direction is found in step 52 of FIG. 4, the best possible binary pattern within a set of patterns that exhibit that gradient direction is found by using binary pattern matching techniques (steps 54 and 56 of FIG. 4). This entails finding the best match of the bit__map found for the elementary unit in the above general algorithm (or in step 48 of FIG. 4) to the set of binary patterns corresponding to the computed quantized gradient direction found in step 56 of FIG. 4.

For 4×4 elementary units, the binary pattern sets for each angle quantization step are as shown in Table I, Rows 1 thru 8 and Columns A, B, C and D and are identified as binary pattern sets by Row and Column designations (e.g., 1A, 2D and 7C, etc.).

The fact that the first and last columns of the four columns of each binary pattern set 1A, 1B and 1C are equal, is exploited during the pattern matching procedure. That is, only the two center columns of the four columns of each binary pattern in Set 1 undergo the pattern matching process. In general, the pattern matching process omits the matching procedure in any section of the 4×4 binary patterns that exhibits equivalent information throughout a set of binary patterns.

Once a binary pattern is selected from a binary pattern set via pattern matching, the appropriate two color values that retain the local contrast of the 4×4 elementary unit are obtained from:

$color_{low} = color_{avg} - K_{low}$ (gradient magnitude color)

$color_{high} = color_{avg} + K_{high}$ (gradient magnitude color)

where color in the above equations represents a color component and both of the two equations need to be computed for the red(r), green(g), and blue(b) components as seen at step 66 in FIG. 5; $color_{avg}$ is the average value of the color component over the 4×4 elementary unit, and $K_{high}$ and $K_{low}$ are coefficients whose values depend on the configuration of the selected binary pattern.

As set forth in FIG. 4 at step 64, the gradient magnitude of each of the three color components is computed from the Euclidean distance exhibited by the vertical change and horizontal change of that color component in the elementary unit. The vertical change can be computed as the sum of the values of the color component in the top half of the elementary unit minus the sum of the values in the bottom half. Likewise, the left half can be subtracted from the right half to obtain the horizontal change.

The values of $K_{low}$ and $K_{high}$ for each of the 28 binary patterns in Table I are computed, it follows, by substituting $K_{low}$ in the binary pattern in every location where there is a "0" value, and $K_{high}$ where there is a "1" value, and solving for the $K_{low}$ and $K_{high}$ values from the formulated equations that result from satisfying the following two conditions:

a. the average value over the 4×4 region must be equal to zero; and b. the gradient magnitude of the substituted region must be equal to 1.0.

Table II provides the $K_{low}$ and $K_{high}$ values for the respective quantized degree direction by Row and Column of Table I and identifies the K value grouping as G1 thru G7. These Table II values are applicable to step 66 of FIG. 5.

Improvements to the VPIC algorithm are still further features of this invention, and as an alternative to using luminance as the threshold to determine the bit__map and compute the gradient direction, the following non-linear luminance data spaces are used:

a. the logarithmic transformation implementation that is adaptive to the dynamic range of the luminance information in the frame (step 20 of FIG. 1A), is generated as described in the before referenced and concurrently filed U.S. patent application (2) entitled System and Method for Measuring Fidelity of Decompressed Video Signals and Images; and b. the non-linear luminance transformation in the CIE L*u*v* 1976 color space as set forth in step 18 of FIG. 1A.

FIG. 1A illustrates the computation of the homogeneity threshold for a frame. A frame is retrieved in step 10. As a result of step 12, luminance from step 14, or non-linear luminance data from steps 16, 18, and 20, is employed. The luminance of the 1976 CIE L*u,v* color system recommendation can be used by proceeding to step 18 from step 16. An alternate non-linear luminance transformation can be employed by proceeding to step 20. The nonlinear transform used is a logarithmic transform. One of the advantages of performing a logarithmic transformation is that multiplicative illumination changes recorded in the captured image are made additive. This logarithmic transformation assumes that a human is likely to perceive that the luminance difference between a value x and 2x is the same as the luminance difference between 2x and 4x. By retaining a fraction P, of the original luminance scale resolution, a dynamic range logarithmic transformation can be expressed as:

$$L(Y) = Y_{min} + [P(Y_{max} - Y_{min} + 1) - 1)] \frac{\log(Y + 1) - \log[Y_{min} + 1)}{\log(Y_{max} + 1) - \log(Y_{min} + 1)}$$

where [$Y_{min}$, $Y_{max}$] is the dynamic luminance scale of the data and where P gives L(Y) a resolution equal to a fraction of the original dynamic range and thus controls how luminance differences between the original image frame and the reconstructed frame are penalized. The range is dynamic rather than fixed to avoid compression at the high intensity end and rarefaction at the low intensity end. In step 22, the standard deviation is computed by sampling the selected luminance data representation at every pixel in the frame to finally compute the homogeneity threshold.

In reference to FIG. 1B, an elementary unit retrieved in step 24 undergoes computation of a left and right standard deviation at step 26, to determine if it is homogeneous in step 28. If the selected luminance data representation of the elementary unit satisfies the test in step 28, it is classified as a homogeneous elementary unit in step 30. Otherwise, it is classified as a non-homogeneous elementary unit in step 32.

FIG. 2 illustrates the method of how the bit—map of an elementary unit is created. The average value of the selected luminance data representation is computed in step 33 and set as a threshold. Based on this threshold, the bit—map is computed in step 34 by comparison to the value of selected luminance data representation at each pixel in the elementary unit. The bit-map can be further processed as, for example, illustrated in FIG. 6.

Figure 3:
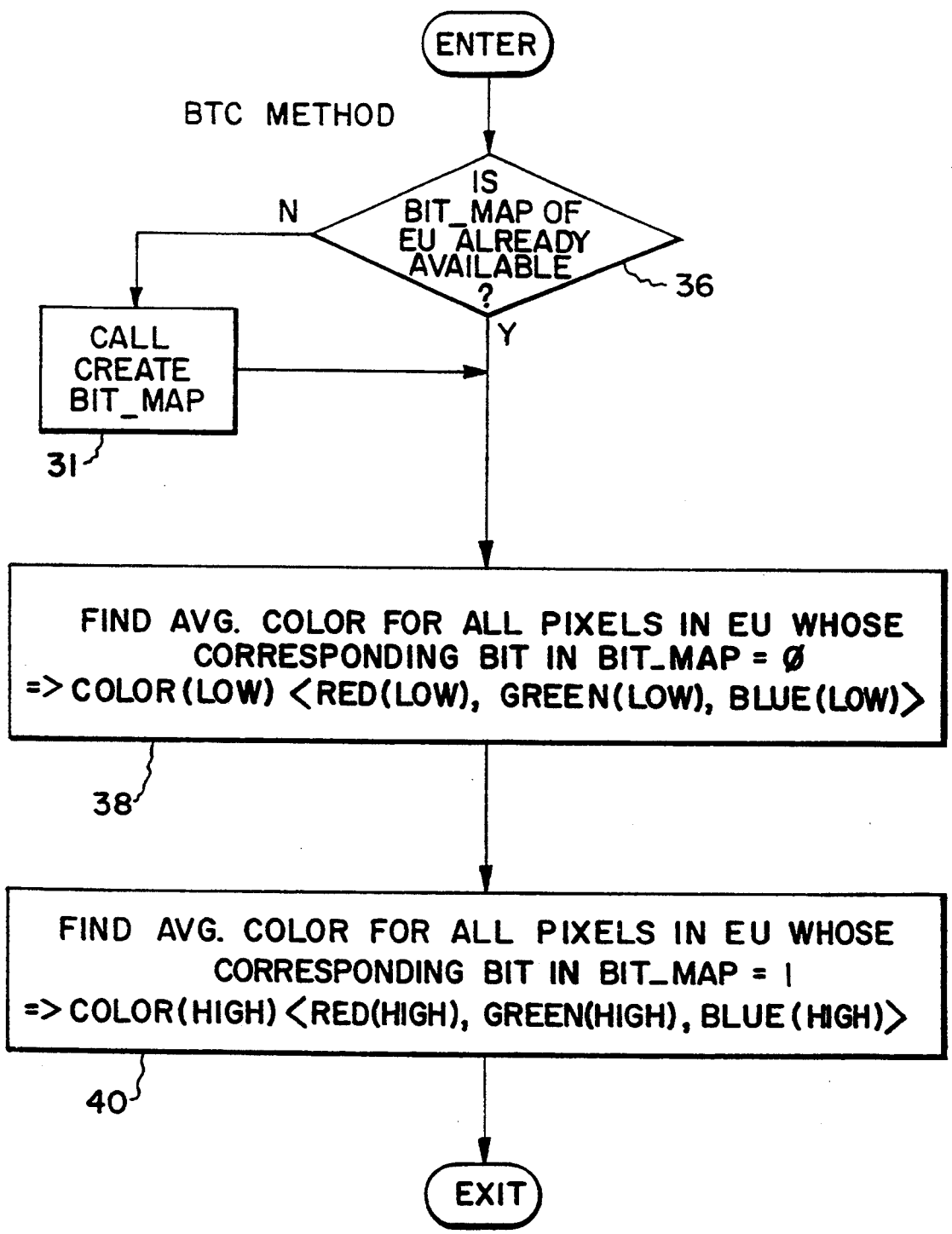
FIG. 3 is a logic flowchart for the block truncation coding method.

FIG. 3 illustrates the BTC method. The process of step 36 determines if the bit—map of the elementary unit has already been created. If it has not been created, steps 31, 38, and 40 are executed. Otherwise, only steps 38 and 40 are executed. Step 38 sums R, G, and B, red, green and blue respectively, components for all pixels with values of zero in the corresponding elementary unit bit map, and divides by the number of zeros in the elementary unit bit map. It finds the average value of each color component for all pixels with a luminance value below the average luminance level of all pixels in the block. Step 40 sums R, G, and B components for all pixels with values of one in the corresponding elementary unit bit map, and divides by the number of ones in the elementary unit bit map. It finds the average value of each color component for all pixels with a luminance value above the average luminance level of all pixels in the block.

Hybrid Intraframe Compression Method:

Further features of this invention are two hybrid intraframe compression methods that result from encoding at step 58 elementary units to be identified as homogeneous, from steps 42, 44 and 46 of FIG. 4, pattern, or as predetermined pattern elementary units with the compression procedures herein described.

As illustrated in FIG. 4 with the first hybrid intraframe compression method, herein referred to as algorithm C1, pattern matching can be used to determine whether an elementary unit from step 42 should be coded as a pattern elementary unit with the BTC procedure previously discussed or as a predetermined-pattern elementary unit with the VPIC procedure. Predetermined-pattern elementary units are preferred when a greater amount of compression is required. Therefore, an error of q pixels (i.e., two or perhaps three pixels in error) in the pattern matching process of the VPIC procedure, as shown at steps 48, 50, 52, 54 and 56, can be tolerated to obtain greater compression. However, if the number of pixels in the bit—map that did not match the best matched pattern is large (i.e., greater than two), at step 60 a pattern elementary unit generated with the BTC process at step 62 should be used to encode the elementary unit.

Figure 6:
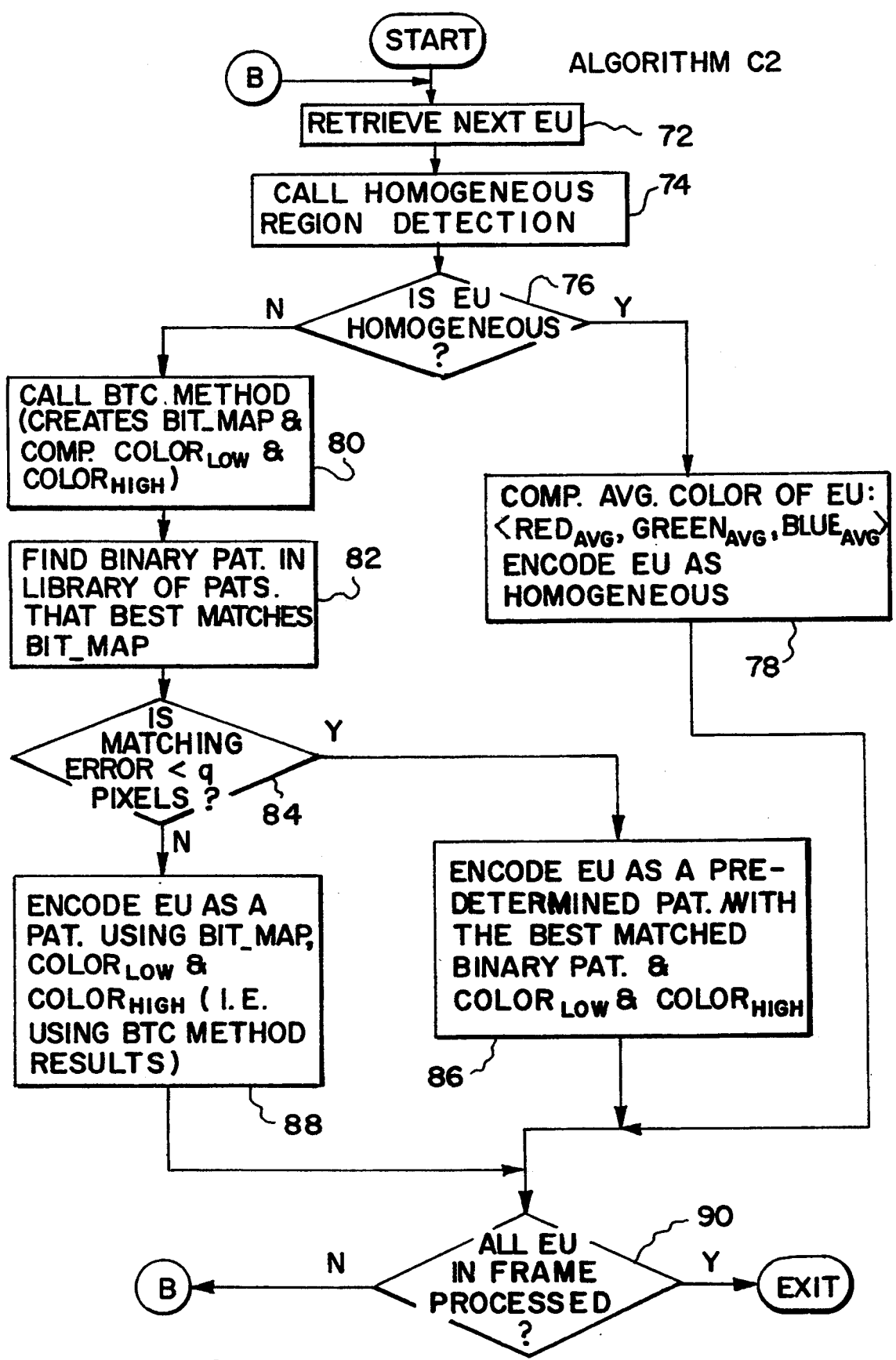
FIG. 6 is a logic flowchart of an intraframe compression method that only compresses elementary units, first by the homogeneous region detection method, second by the block truncation coding method, and third by a binary vector quantization method, in accordance with the principles of this invention.

Alternatively in reference to FIG. 6, with the second hybrid intraframe compression method, herein referred to as algorithm C2, binary vector quantization can be performed on the binary pattern (i.e., the bit—map) obtained with the BTC procedure beginning with step 72 and proceeding through the initial steps of 74 and 76 and on to step 80 without having to employ the VPIC procedure. A table of patterns at step 82, like the set of 28 binary patterns of Table I can be used for this purpose. If in the exemplary illustrated matching process of step 84, the best matched pattern exhibits less than a number of q pixel errors (i.e., 3 pixel errors) at step 84, the elementary unit is encoded as a predetermined-pattern elementary unit at step 86, otherwise it gets encoded as a pattern elementary unit at step 88. The advantage of the binary vector quantization approach is that it does NOT restrict the pattern of Table I matching to the above 28 patterns that represent edges. Step 90 addresses whether all EUs are processed. Step 78 functions step 58 previously discussed.

More elaborate, and any number of binary patterns can be used employing the inventive techniques of algorithm C2 in FIG. 6. Experimental results indicate that patterns with an approximately equal distribution of "0"s and "1"s tend to be matched more often. This is due to the fact that homogeneous region detection tends to prohibit the bit—map from exhibiting an uneven distribution of "0"s and "1"s.

Therefore, with the binary vector quantization approach, the set of predetermined binary patterns can contain:

1. bands—two columns or rows of "1"s comprising the center of each 4 column, 4 row pattern and "0"s in the outer columns or rows, respectively, or vice-versa;
2. corners—for instance, the left column and top row of the 4×4 binary pattern have one of the two binary values while the rest of the binary pattern has the other binary value; and
3. concentric rectangle—the four center pixels of the binary pattern have one binary value and the balance of the region has the other binary value.

Hybrid Interframe and Intraframe Compression Methods:

Unchanged elementary units can be detected by comparing (rather than subtracting) corresponding elementary units (i.e., same spatial location) in two different frames. The comparison can be performed prior to, or after performing the intraframe compression procedures described in this disclosure.

Interframe Compression Prior to Intraframe Compression

The techniques disclosed in the above related System and Method for Frame-Differencing Video Compression/Decompression Using Perceptually-Constant Information and Image Analysis U.S. patent application (3) are used in this procedure. If the number of pixels that match in elementary unit to elementary unit comparisons (i.e., corresponding pixels within the elementary units are compared) is above a given threshold, (e.g., 13 or more of the 16 pixels in a 4×4 elementary unit match), the elementary unit in the succeeding frame is specified as an unchanged elementary unit.

Interframe Compression After Intraframe Compression

The color value comparisons described below are disclosed in the above related System and Method for Frame Differencing Video Compression/Decompression Using Perceptually-Constant Information and Image Analysis U.S. patent application (3).

1. Homogeneous to homogeneous elementary unit comparisons: The entire elementary unit is treated as a single pixel. If the elementary unit of frame $F_i$ and the corresponding elementary unit in a succeeding frame are both homogeneous, their two assigned color values are compared with frame differencing techniques to determine if they did not change.

2. Non-homogeneous to non-homogeneous elementary unit comparisons: A non-homogeneous elementary unit is a pattern or a predetermined pattern elementary unit. Two conditions must be satisfied:

a. Color information comparison is treated as if two pixel-to-pixel color comparisons are being performed with the frame-differencing techniques. One of the color values in the non-homogeneous elementary unit of $F_i$ must match one of the two color values of the non-homogeneous elementary unit in the succeeding frame. The second color value of the non-homogeneous elementary unit of $F_i$ must match the other color value of the non-homogeneous elementary unit in the succeeding frame; and b. Binary pattern comparison is performed with the exclusive-or operator. If the number of pixels in error is below a given threshold (typically equal to three), the binary patterns are assumed to match from frame to frame.

3. Homogeneous to non-homogeneous elementary units comparison: This is treated as if one pixel is being compared to two pixels and requires that the following three conditions be satisfied:

a. The difference between the two color values in the non-homogeneous elementary unit is below a threshold;

b. Color value 1 in the non-homogeneous elementary unit must match the color value of the homogeneous elementary unit; and c. Color value 2 in the non-homogeneous elementary unit must match the color value of the homogenous elementary unit.

Figure 7:
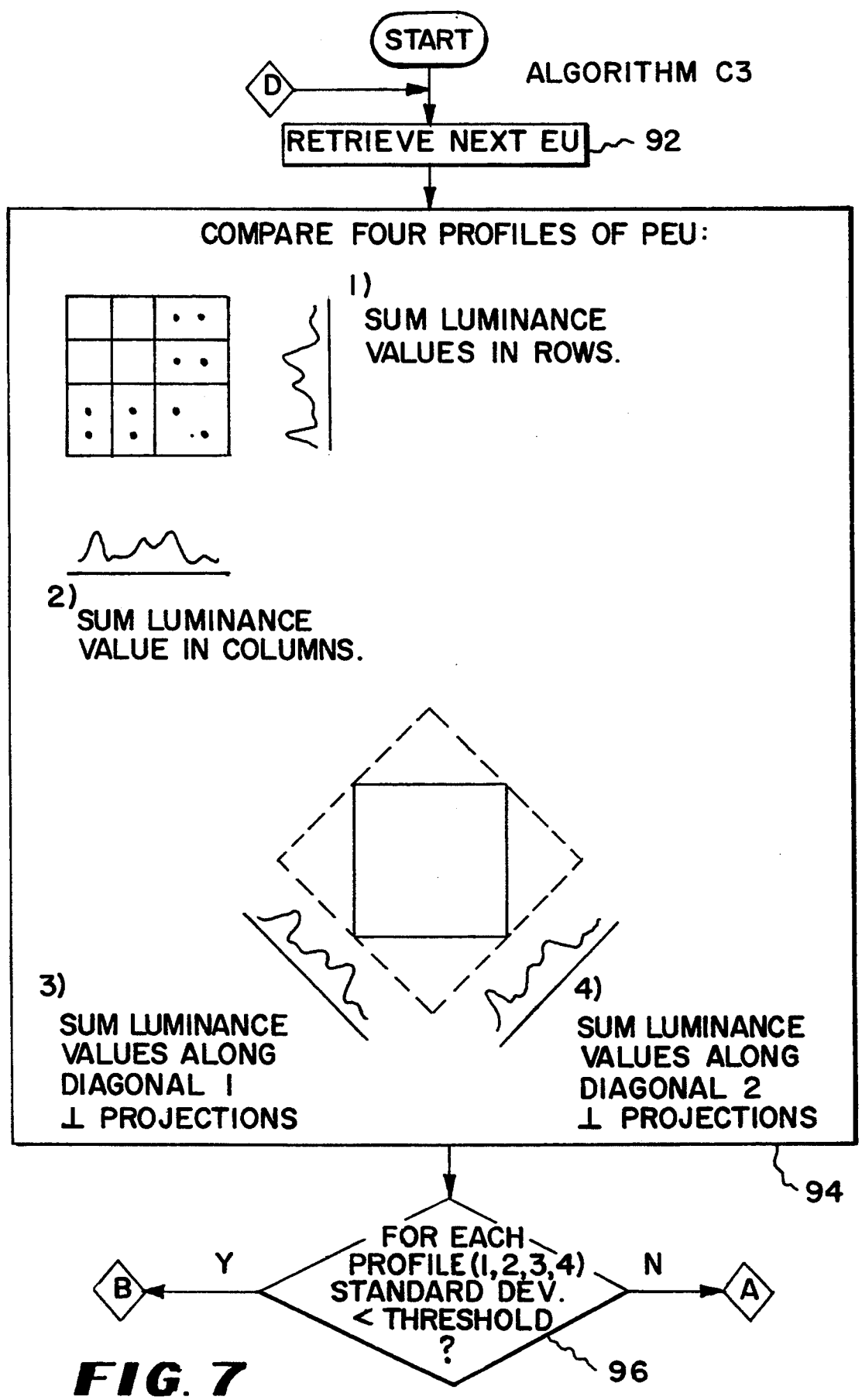
FIG. 7 is a logic flowchart of an intraframe compression method that compresses parent elementary units (PEU) as well as elementary units (EU) in accordance with an embodiment of the present invention.

Method for Compressing Parent Elementary Units and Elementary Units:

This hybrid intraframe compression method is referred to as algorithm C3. FIG. 7 illustrates this method. Step 92 accesses the next parent elementary unit in the sequence of ordered parent elementary units in the frame.

In step 94 four profiles of luminance data of the 8×8 region get projected respectively onto the horizonal and vertical axes, and onto the diagonals 1 and 2 of the 8×8 region. Illustrated step 1 of FIG. 7 sums the four luminances of the four horizontal rows to produce a histogram of four values. Step 2 sums the four luminances of the four vertical columns to produce a histogram of four values. Step 3, within step 94, sums the luminances along 45 degree angular lines through the block to produce a histogram. This can be done in a number of ways, but the resulting histogram should be of the same magnitude as the histograms of steps 1 and 2 of step 94. Finally step 4 sums the luminances along −45 degree angular lines through the block to produce a histogram. This also can be done in a number of ways, but the resulting histogram should be of the same magnitude as the histograms of steps 1 and 2 of step 94.

The standard deviation of the amplitude of each profile is computed in step 96. Also in step 96, each of the four computed standard deviations is tested to determine if it is less than a small threshold value. If the four standard deviations satisfy the test, the parent elementary unit is considered to be homogeneous and the method proceeds to step 102. Alternatively, homogeneous region detection over the parent elementary unit could be performed in step 96 with the procedure illustrated in FIG. 1B.

Figure 8:
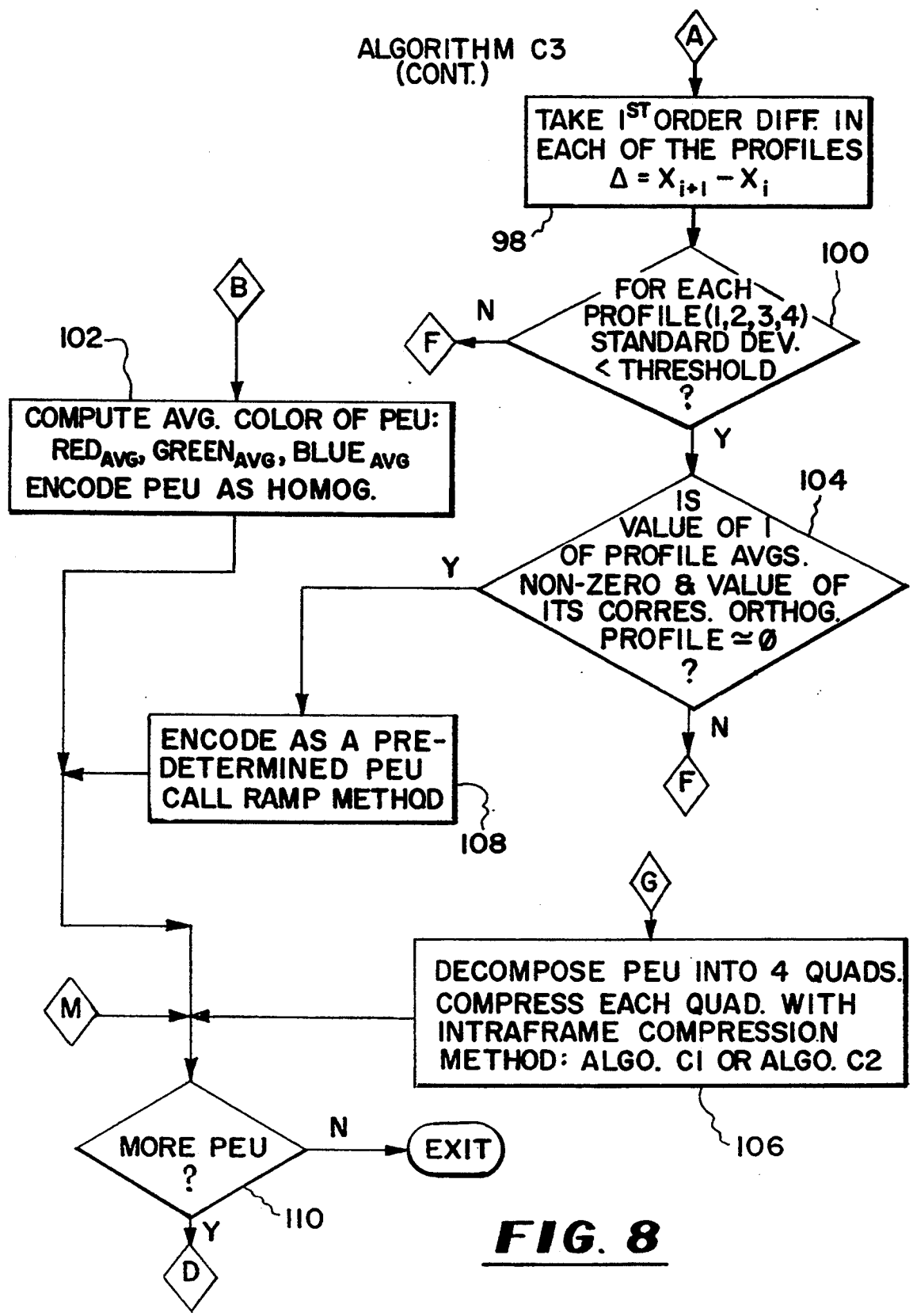
FIG. 8 is a continuation of the processes illustrated in FIG. 7.

A homogeneous parent elementary unit is encoded in step 102 FIG. 8 by computing the average color value over its complete spatial domain. Step 102 proceeds to step 110 where it is determined if there exists additional parent elementary units to be encoded in the frame. If all parent elementary units in the frame have been encoded, the method is exited. Otherwise, the method returns to step 92 of FIG. 7.

If the test of step 96 is NOT satisfied by the four standard deviations, the method continues in step 98, of FIG. 8 where a first-order differential operator on each collected profile is performed.

Step 100 is executed after step 98. Step 100 determines if the output of the first-order differential operator is approximately constant throughout the four profiles.

This is performed by computing the standard deviation of the amplitude of the output of the first-order differential operator in each profile. Each standard deviation is tested to determine if it is less than a small threshold value. If the test of step 100 is satisfied by the four standard deviations, the method proceeds to step 104 to determine if a 2-D ramp function can be fitted in one of eight possible directions at 45 degree increments. The test for a 2-D ramp function imposes that the following additional condition be satisfied in addition to fulfillment of step 100.

The condition that must be satisfied to detect a gradually changing ramp, as expressed in step 104, is that the output of the first-order differential operator in one of the profiles is approximately equal to zero, while its orthogonal profile exhibits an approximately constant value above a threshold.

The ramp encoding procedure in step 108 is explained by the following example. Suppose that the output in the profile collected in the vertical axis is approximately zero and the profile projected onto the horizontal axis is approximately constant and greater than 12. Then, the two color values used to represent the gradually changing ramp are obtained by respectively averaging the color values in the left two columns of the 8×8 pixel region (first color value) and the color values in the two right columns (second color value). This is shown in the top right 8×8 parent elementary unit illustrated in Table IV. The ramp as shown in the top right 8×8 binary pattern of Table III is then specified with a predetermined binary pattern changing in distribution of "0"s and "1"s from left to right, where the left side has a high concentration of O's and the right side of the 8×8 binary pattern has a high concentration of 1's. The pattern definitions' elements for Table III are defined as follows:

T=number of Xs in the top four rows;
B=number of Xs in the bottom four rows;
L=number of Xs in the left four columns; and
R=number of x's in the right four columns.

The pattern labels are defined as follows:
  (a) top two patterns:
    N-to-S (vertical axis delta')=T−B;
    E-to-W (horizontal axis delta')=R−L;
  (b) bottom two patterns:
    SW-to-NE (45 degree diagonal axis delta') =SW half-NE half;
    NW-to-SE (−45 degree diagonal axis delta') =NW half-SE half; and
  (c) direction of decreasing luminance=$\tan^{-1}((T-B)/(R-L))$.

Whereas Table IV represents with an X the pixels of the block that should be selected for averaging for the colors of the block. For instance. the upper-left illustration shows that for a vertical ramp, the top two rows should be averaged to represent the color for the top four rows, and the bottom two rows should be averaged to represent the color for the bottom four rows. The middle four rows should not be included in the average as they are a mixture that would tend to dull the overall color of the block.

Similarly, any ramps in any of eight possible directions at 45 degree increments can be detected and specified as predetermined-patterns. The set of predetermined binary patterns used to encode the eight 2-D (two-dimensional) ramp functions are illustrated by the four patterns in Table III (and their inverses). Table IV depicts the corresponding pixel locations sampled in the 8×8 region to compute the two average color values.

Returning to the process of step 104, if a 2-D ramp function is detected, the method proceeds to step 108 where the parent elementary unit is encoded as a predetermined pattern parent elementary unit. Step 108 leads to step 110.

Figure 9:
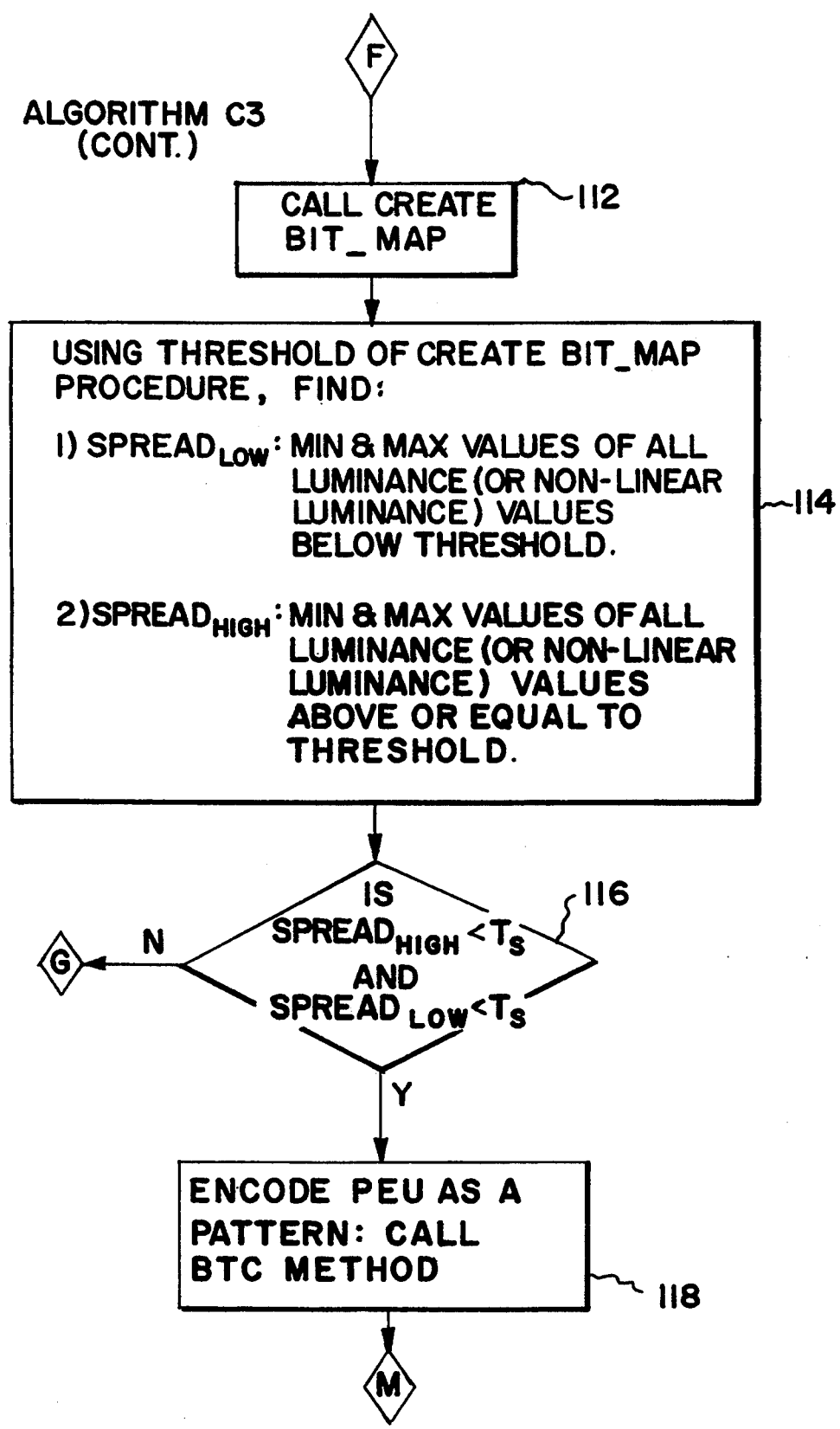
FIG. 9 is a continuation of the processes illustrated in FIG. 7.

If the conditions of a 2-D ramp function are not satisfied in step 100 or step 104, the method is directed to step 112 in FIG. 9. Steps 112, 114, and 116 determine if the dynamic range of the luminance (or non-linear luminance) pixel distributions associated with the typical BTC method, are small. In such event, the parent elementary unit is encoded with the BTC method in step 118.

In particular, if an 8×8 region fails the ramp test, it undergoes a test to determine whether it can be encoded with the BTC procedure. The bit—map of the parent elementary unit is created in step 112 of FIG. 9. The spread of the distribution of the luminance values below the threshold used to produce the bit-map, and the spread of the distribution of the luminance values above the threshold used to produce the bit-map are checked in step 114. If each spread is below a threshold in step 116, the 8×8 region is encoded as pattern parent elementary unit with the BTC procedure in step Finally, if an 8×8 region cannot be encoded with the three procedures above (i.e., the test in step 116 failed), the 8×8 region is decomposed into quadrants (i.e., elementary units) in step 106 of FIG. 8, and each elementary unit is compressed by following the sequence of procedures previously described in algorithm C1 or algorithm C2.

While the invention has been particularly shown and described with reference to a preferred embodiment, it will be understood by those skilled in the art that various changes in form and detail may be made therein without departing from the spirit and scope of the invention.

What is claimed is:

1. A method of detecting image regions for compressing and reconstructing a color image segment, the method comprising the steps performed by a computer system of:
   recording the color image segment as a sequence of frames, each of said frames comprising a plurality of pixels organized in an array of pixel locations;
   decomposing each of said frames, in the sequence of frames, into non-overlapping contiguous rectangular frame regions wherein each of said frame regions comprises an array of at least 4×4 pixels;
   generating a luminance value for each of said frames and each of said frame regions within each of said frames;
   generating a standard deviation of the luminance of each of said frames;
   selecting a threshold luminance homogeneity value of each of said frames as a function of the standard deviation of the luminance of each of said frames;
   generating a standard deviation of the luminance of each of said frame regions as a function of combining pixels into ,groups and comparing luminance values of each of said groups within each of said frame regions;
   comparing the standard deviation of the luminance of each of said frame regions to the threshold luminance homogeneity value and quantizing each of said regions as a function of the standard of deviation of the luminance of each of said frame regions being less than, or homogeneous, or greater than, or non-homogeneous, the selected threshold luminance homogeneity value; and
   responsive to the step of quantizing, encoding each of said frame regions to provide a detection indicator for further processing each of said frame regions as a homogeneous or non-homogeneous frame region for compression reconstruction.

2. A method of generating threshold values for detecting image regions for compression and reconstruction of a color image segment, the method comprising the steps performed by a computer system of:
   recording the color image segment as a sequence of frames, each of said frames comprising a plurality of pixels organized in an array of pixel locations;
   decomposing each of said frames, in the sequence of frames, into non-overlapping contiguous rectangular frame regions wherein each of said regions comprises an array of at least 4×4 pixels;
   generating a luminance value for at least a portion of each of said frames;
   generating a standard deviation of the luminance of each of said frames;
   generating a threshold luminance homogeneity value of said at least a portion of each of said frames as a function of the standard deviation of the luminance of each of said frames; and
   responsive to the step of generating the threshold luminance homogeneity value of each of said frames, evaluating differences between each of said frames as a function of the threshold luminance homogeneity value for each of said frames subjected to selective compression and subsequent reconstruction of images.

3. A method of detecting image regions for compression and reconstruction of a color image segment, the method comprising the steps performed by a computer system of:

recording the color image segment as a sequence of frames, each of said frames comprising a plurality of pixels organized in an array of pixel locations;

decomposing each of said frames, in the sequence of frames, into non-overlapping contiguous rectangular frame regions wherein each of said frame regions comprises an array of at least 4×4 pixels;

generating a luminance value for each of said frames and each of said frame regions within each of said frames;

generating a standard deviation of the luminance of each of said frames;

selecting a threshold luminance homogeneity value of each of said frames as a function of the standard deviation of the luminance of each of said frames;

generating a standard deviation of the luminance of each of said frame regions as a function of combining pixels into groups and comparing luminance values of each of said groups within each of said frame regions;

comparing the standard deviation of the luminance of each of said frame regions to the threshold luminance homogeneity value and quantizing each of said regions as a function of the standard of deviation of the luminance of each of said frame regions being less than, or homogeneous, or greater than, or non-homogeneous, the selected threshold luminance homogeneity value;

responsive to the step of quantizing further processing any non-homogeneous frame region for compression by creating a binary pattern of said any non-homogeneous frame region;

creating a binary pattern table as a function of said luminance values of each of said frame regions within each of said frames;.

comparing by matching said binary pattern of said any non-homogeneous frame region with said binary pattern table to generate a comparison deviation of said any non-homogeneous frame region and quantizing the comparison deviation of said any non-homogeneous frame region with a given threshold of deviation; and encoding said any non-homogeneous frame region to provide a detection indicator for further processing as a function of value differences between the comparison deviation of said non-homogeneous frame region and a given threshold of deviation.

4. A method of detecting image regions for compression and reconstruction of a color image segment, the method comprising the steps performed by a computer system of:

recording the color image segment as a sequence of frames, each of said frames comprising a plurality of pixels organized in an array of pixel locations;

decomposing each of said frames, in the sequence of frames, into non-overlapping contiguous rectangular frame regions wherein each of said frame regions comprises an array of at least 4×4 pixels;

generating a luminance value for each of said frames and each of said frame regions within each of said frames;

generating a standard deviation of the luminance of each of said frames;

selecting a threshold luminance homogeneity value of each of said frames as a function of the standard deviation of the luminance of each of said frames;

generating a standard deviation of the luminance of each of said frame regions as a function of combining pixels into groups and comparing luminance values of each of said groups within each of said frame regions;

comparing the standard deviation of the luminance of each of said frame regions to the threshold luminance homogeneity value and quantizing each of said regions as a function of the standard of deviation of the luminance of each of said frame regions being less than or homogeneous, or greater than or non-homogeneous, the selected threshold luminance homogeneity value;

responsive to the step of quantizing further processing any non-homogeneous frame region for compression by creating a binary pattern of said any non-homogeneous frame region;

generating average color values of said at least 4×4 pixels in said each of said frame regions;

creating a binary pattern table as a function of said luminance values and color values of each of said frame regions within each of said frames;

comparing by matching said binary pattern of said any non-homogeneous frame region with said binary pattern table to generate a comparison deviation of said any non-homogeneous frame region and quantizing the comparison deviation of said any non-homogeneous frame region with a given threshold of deviation; and encoding said any non-homogeneous frame region for a first level of compression as a function of said binary pattern having a number of pixels that did not match a selected binary pattern in said binary pattern table, which number is less than a given binary pattern pixel threshold and encoding each of said frame region for a second level of compression less than said first level of compression as a function of said number of pixels that did not match said selected binary pattern which is greater than said given binary pattern pixel threshold.

5. The method of detecting image regions for compressing and reconstructing a color image segment, as defined in claim 1, wherein the step of generating a luminance value performs a non-linear luminance transformation technique.

6. The method of detecting image regions for compressing and reconstructing a color image segment, as defined in claim 1, wherein the step of generating a luminance value further comprises the steps for generating luminance profiles for each of said frame regions comprising summing luminance values across a horizontal profile of horizontal rows portioning each of said frame regions, summing luminance values across a vertical profile of vertical columns portioning each of said frame regions, summing luminance values across a positive diagonal profile of a diagonal line disposed at a plus 45 degrees to the horizontal rows and summing luminance values across a negative diagonal profile of a diagonal line disposed at a negative 45 degrees to the horizontal rows and wherein the step of generating said standard deviation of the luminance of each of said frame regions generates said standard of deviation for each of said horizontal, vertical, positive diagonal and negative diagonal profiles as a function of the respective summed luminance values of each said horizontal, vertical, positive diagonal and negative diagonal profile.

7. The method of detecting image regions for compressing and reconstructing a color image segment, as defined in claim 6, wherein the step of encoding each of said frame regions encodes each non-homogeneous frame region after creating a binary pattern of said each of said non-homogeneous frame regions wherein a function of said standard of deviation for each of said profiles is greater than a threshold profile value or wherein a first profile of said profiles for said each frame region is not of zero value and a second profile of said profiles, corresponding to said each frame and orthogonal to said first profile, is also not of zero value.

8. The method of detecting image regions for compressing and reconstructing a color image segment, as defined in claim 6, wherein the step of encoding each of said frame regions encodes each homogeneous frame region after averaging color values in different areas of each of said frame regions.

9. The method of detecting image regions for compressing and reconstructing a color image segment, as defined in claim 1, wherein the step of encoding each of said frame regions encodes homogeneous frame regions by computing and specifying an average color value for each of said homogeneous frame regions.

10. The method of detecting image regions for compression and reconstruction of a color image segment, as defined in claim 3, wherein the step of encoding each of said frame regions encodes each non-homogeneous frame region as a function of the comparison deviation.

11. The method of detecting image regions for compression and reconstruction of a color image segment, as defined in claim 1 0, wherein the step of comparing compares pixels within said binary pattern with pixels within said binary pattern table and wherein the step of encoding encodes each of said frame regions for a first level of compression as a function of said binary pattern having a number of pixels that did not match a selected binary pattern in said binary pattern table which number is less than a given binary pattern pixel threshold and encodes each of said frame regions for a second level of compression less than said first level of compression as a function of said number of pixels that did not match said selected binary pattern which is greater than said given binary pattern pixel threshold and as a function of gradient magnitude values of pixel color components.

12. The method of detecting image regions for compression and reconstruction of a color image, as defined in claim 3, wherein the step of creating a binary pattern includes the step of identifying a gradient direction of the luminance value of each of said frame regions as a function of luminance value changes across said each of said frame regions and as a function of luminance value changes across said binary pattern of said each of said frame regions.

* * * * *